US000001216H

United States Statutory Invention Registration [19]

[11] Reg. Number: H1216

[43] Published: Aug. 3, 1993

Vigil et al.

[54] LINEAR SHAPED CHARGE

[75] Inventors: Manuel G. Vigil, Albuquerque, N. Mex.; Ronald Karak, Rockaway, N.J.

[73] Assignee: The United States of America as represented by the Secretary of the Army, Washington, D.C.

[21] Appl. No.: 23,754

[22] Filed: Feb. 19, 1993

Related U.S. Application Data

[63] Continuation of Ser. No. 931,466, Aug. 20, 1992, abandoned.

[51] Int. Cl.[5] ..... F42B 1/028

[52] U.S. Cl. ..... 102/306; 102/476

[56] References Cited

U.S. PATENT DOCUMENTS

| | | | |
|---|---|---|---|
| 2,543,057 | 2/1951 | Porter | 102/307 |
| 2,796,022 | 6/1957 | Delacour | 102/306 |
| 3,176,613 | 4/1965 | Godfrey | 102/306 |
| 3,477,372 | 11/1969 | McFerrin et al. | 102/307 |
| 4,114,537 | 9/1978 | Brown | 102/306 |
| 4,253,523 | 3/1981 | Ibsen | 102/307 |
| 4,693,181 | 9/1987 | Dadley et al. | 102/307 |
| 4,815,384 | 3/1989 | Ringel et al. | 102/307 |
| 4,860,655 | 8/1989 | Chawla | 102/476 |

*Primary Examiner*—Harold J. Tudor
*Attorney, Agent, or Firm*—Anthony T. Lane; Edward Goldberg; Michael Sachs

[57] ABSTRACT

A lightweight linear shaped charge for explosive cutting and penetration of a target, which includes a plastic linear housing in the form of a concave channel with an inverted "V" shaped metallic liner mounted within the concave channel. An explosive charge is shaped and held between the plastic housing and the metallic liner. Upon detonation of the explosive charge an explosive jet of the metallic liner is generated to cut and penetrate the target. Also, the plastic linear housing may be extended downward a short standoff distance of approximately 0.5 to 1 inch for optimum cutting and penetration of the target.

3 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

LINEAR SHAPED CHARGE

This application is a continuation of application Ser. No. 07/931,466, filed Aug. 20, 1992, now abandoned.

GOVERNMENTAL INTEREST

The invention described herein may be manufactured, used, and licensed by or for the Government for Governmental purposes without payment to us of any royalties thereon.

BACKGROUND OF THE INVENTION

The invention relates to a lightweight linear shaped charge used for explosive cutting of a target. The invention uses a lightweight plastic housing enclosing a metallic inverted "V" shaped liner, with an explosive charge between the plastic housing and the metallic liner.

DESCRIPTION OF THE PRIOR ART

Current commercial linear shaped charges used for explosive cutting are manufactured by squeezing an explosive filled metal tube or pipe into a "V" shaped configuration. The resultant shaped charge is heavier in weight than it needs to be for achievement of target cutting performance, because of the heavy total metal encasement. Only the bottom "V" shaped portion of the metal case, between the explosive and the target, is effectively used in the cutting process. The upper portion of the metal case does add confinement to the explosive, which aids somewhat in the cutting performance, but this can be done by increasing the amount of explosive with a much lower weight of the shaped charge. The upper portion of the metal case also creates hot metal fragments which could pose hazards to personnel near the charge when it is fired. For most commercial applications, the unnecessary added weight and the hot metal fragments are not a concern. However, certain military applications, such as special operations force demolition missions, require that the shaped charge weight be minimized to enable manportability and the ability to parachute with the shaped charge. Also some military breaching operations, such as building entry, will require personnel to be in proximity to the charge when it is fired and the hot metal fragments must be minimized. The military needs for lightweight, low fragmentation linear shaped charges have been identified in the last few years. None of the commercial linear shaped charges can meet the military's performance requirements.

SUMMARY OF THE INVENTION

The invention solves the above problems by replacing the heavy metal upper case with a lightweight plastic housing which encloses a metallic inverted "V" shaped liner, with an explosive charge between the plastic housing and the metallic liner. In addition the metallic liner is optimized in terms of metal thickness and angles for maximum cutting performance. Also, the invention provides integral extensions from the plastic housing to make a standoff separation of the metallic liner from the target to ensure optimum metal jet formation and best performance.

The novel features of the invention, as well as the invention itself, both as to organization and operation, will best be understood from the accompanying drawing, taken in conjunction with the following description.

DETAILED DESCRIPTION

Figure 1:
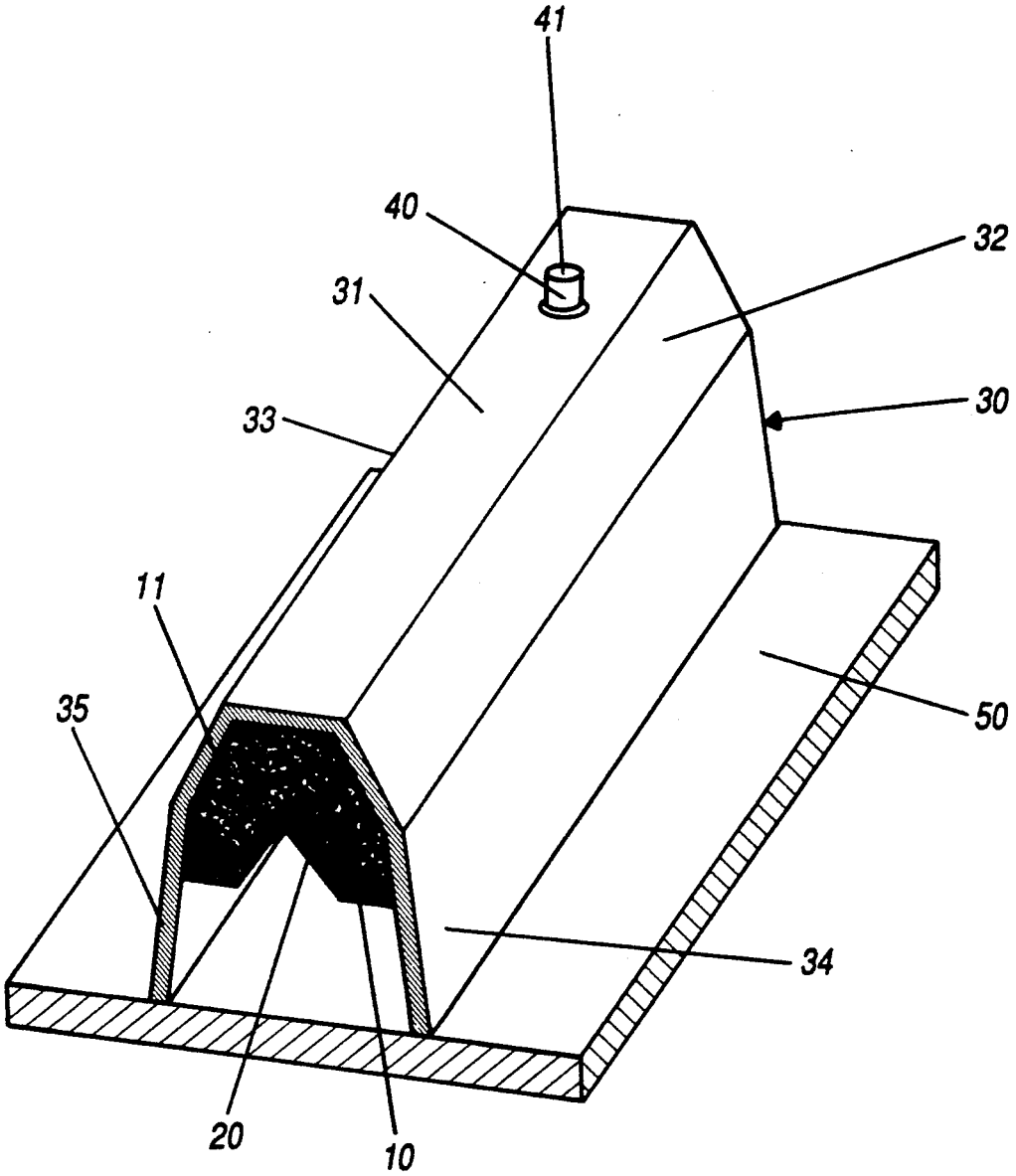
FIG. 1 is a partial side view of the lightweight linear shaped charge of the invention.

Referring to FIG. 1 it is seen that the preferred embodiment of the invention includes a lightweight plastic housing generally referred to as 30. The plastic housing 30 has the configuration of an elongated linear channel with a flat top section 31 joined on each linear side of the top section 31 by two downwardly extending and outwardly angled arms 32, 33. The plastic housing 30 is in the form of a concave channel formed by the top 31 and the arms 32, 33 with the concavity opening downward toward a target 50. A metallic liner, generally designated as 20, is mounted along the full length of the plastic housing 30 within the concave opening and attached along the interior length of each opposing arm 32, 33. The metallic liner has an inverted "V" shape with the opening of the "V" facing downward towards the target 50. The plastic housing 30 and the metallic liner 20 form an enclosed space 10 extending linearly between the plastic housing 30 and the metallic liner 20. An explosive 11 is held within the hollow space 10. A detonator holder 40 is connected to the plastic housing 30 at an intermediate location along the top 31. A detonator 41 is inserted within the detonator holder 40.

The operation of the linear shaped charge of the invention is commenced by manually placing the plastic housing 30 with the arms 32,33 extending downward and in contact with the target 50. Upon detonation of the detonator 41 the explosive 11 is actuated and results in an explosive jet which is optimized on top of the inverted "V" of the metallic liner 20 and concentrated downward for penetration and cutting of the target 50. By varying the thickness of the metallic liner 20 and by changing the angles of the inverted "V" of the metallic liner 20 the invention provides a wide range of explosive metallic jets for different target 50 penetration and cutting requirements. In addition, the invention provides integral legs 34,35 extending downward from the opposing arms 32,33 respectively. These legs 34,35 provide a standoff distance distance in the optimum range of approximately 0.5 to 1 inch from the target 50 so as to maximize the penetration and cutting forces unleashed by the lightweight linear shaped charge. It can be seen that the novel plastic housing 30 holds the metallic liner 20 and the explosive 11 together at a designated standoff distance from the target 50 for optimum jet formation to penetrate and cut the target 50. Those skilled in the art of linear shaped charges will utilize the Munro effect in determining the variables of housing 30, liner 20, and explosive 11 to be used for particular target 50 penetration and cutting. The explosive 11 effectively accelerates the metallic liner 20 for penetration and cutting. The plastic housing 30 reduces the weight of the lightweight linear shaped charge of the invention as well as minimizing the fragment hazard of the former metal cases or pipes. The above novel features of the invention will enable a cutting performance equal to current metal housing and pipe charges while weighing less than one-half the weight thereof.

It is to be understood that the above description and the accompanying drawing are merely illustrative of the preferred embodiment of the invention, and that no limitations are intended in limitation thereof other than as defined in the appended claims.

We claim:

1. A lightweight linear shaped charge for explosive cutting and penetration of a target, which comprises:

a plastic linear housing having a flat top connected along its length to two opposing arms to form a hollow concave channel therebetween with the concavity opening downward toward the target for cutting and penetration;

a metallic liner, having an inverted "V" shape, mounted within the concave opening and attached along the interior length of each opposing arm, with the top of said inverted "V" shape extending lengthwise along the interior of said linear housing beneath said flat top and above the target, so as to form a hollow interior space between said metallic liner and said plastic housing;

an explosive charge shaped and held within said hollow interior space between said metallic liner and said plastic housing; and a detonator holder connected to said plastic housing and holding a detonator therein for initiation of said explosive charge to make an explosive jet of said metallic liner for cutting and penetration of the target.

2. The lightweight linear shaped charge of claim 1, wherein each of said opposing arms are integrally extended a short distance outward and downward toward the target.

3. The lightweight linear shaped charge of claim 2, wherein the the extension of each of said opposing arms is for a distance of approximately 0.5 to 1 inch.

* * * * *